United States Patent [19]
Lambert et al.

[11] 3,917,105
[45] Nov. 4, 1975

[54] INSERT ASSEMBLY FOR RECORD KEEPING

[76] Inventors: Gray Lambert; Paul N. Hanselman, both of Wheaton, Ill.

[22] Filed: Nov. 9, 1973

[21] Appl. No.: 414,426

[52] U.S. Cl. .................................. 220/22; 229/27
[51] Int. Cl.² ...................................... B65D 57/00
[58] Field of Search ......... 220/22; 229/14 B, 14 BE, 229/27, 42

[56] References Cited
UNITED STATES PATENTS

| | | | |
|---|---|---|---|
| 1,202,986 | 10/1916 | Fogg | 229/42 |
| 1,906,892 | 5/1933 | White | 220/22 |
| 2,159,451 | 5/1939 | Richards | 229/27 |
| 2,201,547 | 5/1940 | Scheinman | 229/14 R |
| 2,606,710 | 8/1952 | Reaves | 229/27 |

Primary Examiner—William I. Price
Assistant Examiner—Steven M. Pollard
Attorney, Agent, or Firm—Hill, Gross, Simpson, Van Santen Steadman, Chiara & Simpson

[57] ABSTRACT

A tray assembly for record keeping is especially equipped to facilitate organizing of financial records and provides means for ready storage and retrieval of such records, especially as related to checkbook transactions. Provision is made for checkbook storage, monthly bank statement storage, storage of canceled checks by desirable categories and useful subdivisions, and storage of collateral records. Various record receiving pockets and subdivisions are provided by a unique, simple, low cost arrangement of insert assembly made from folded die cut and scored sheet material blanks received within the tray.

12 Claims, 9 Drawing Figures

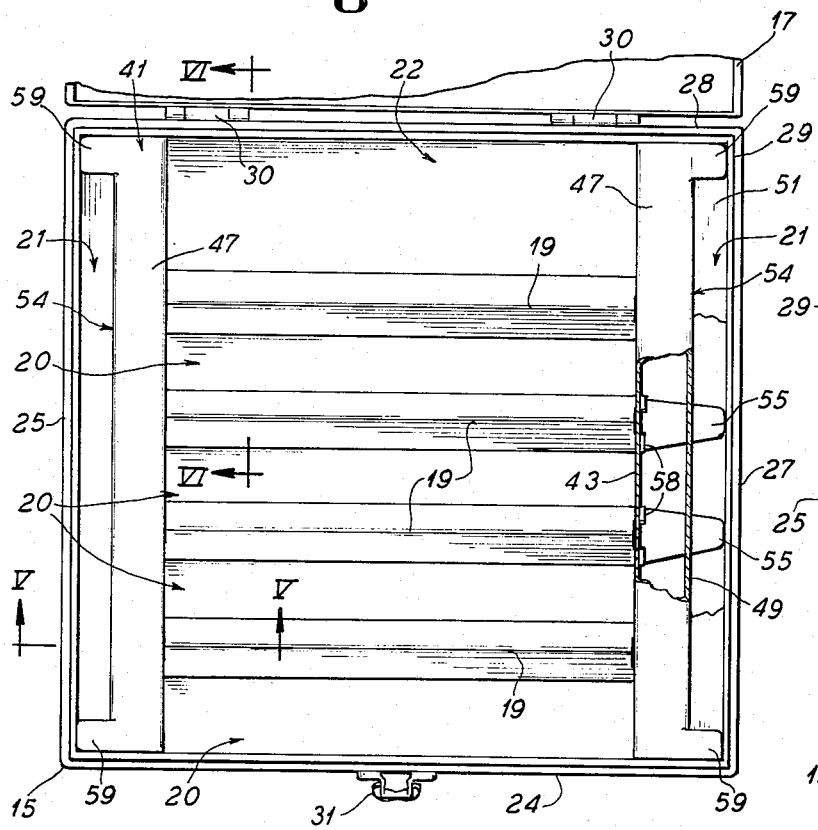
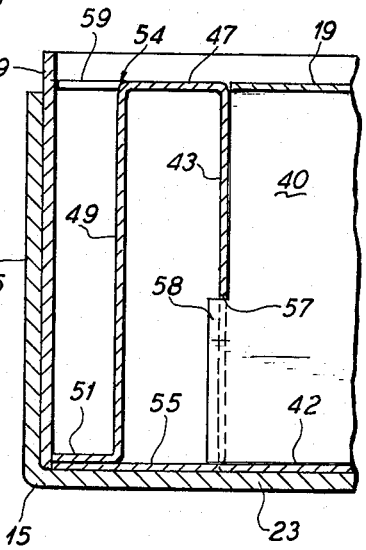
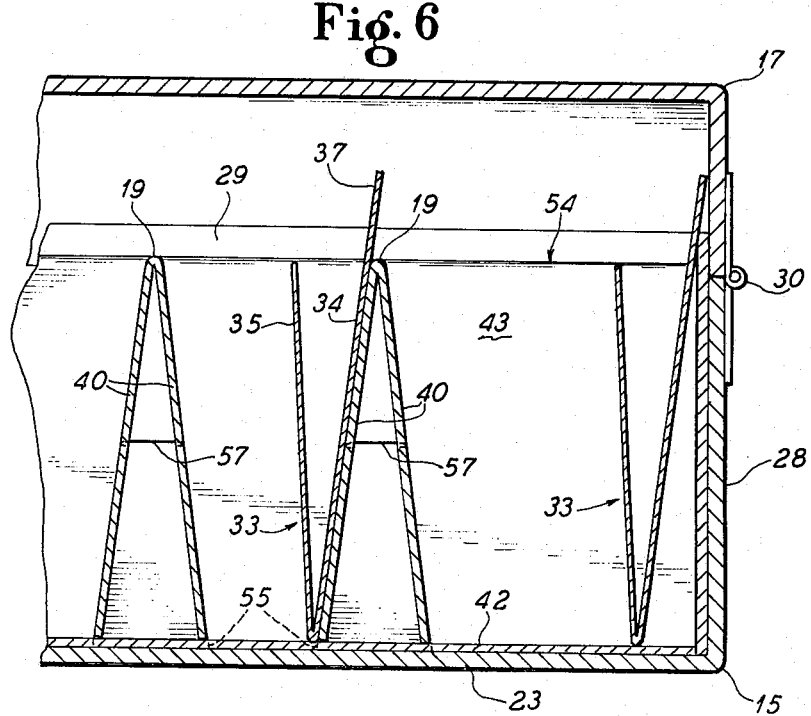

INSERT ASSEMBLY FOR RECORD KEEPING

This invention is concerned with means to facilitate record keeping, especially as related to financial transactions effected by writing of checks, and records collateral to the writing of and preservation of checks and the financial records provided thereby, and is more particularly concerned with a new and improved tray assembly especially suited for this purpose.

Householders and others who must keep their own records and do not have the volume of financial and business records to warrent professional accounting assistance, at least for the accumulation of such records, are generally beset by the problem of keeping and organizing their records. An important reason for keeping complete records, of course, is to make them readily available for tax computation, both initially and on possible review, but there are other reasons for maintaining good personal financial records, such as for budget achievement, proofs of payment, expenses incurred, and the like.

An important object of the present invention is to provide new and improved means for orderly organization, availability, storage and retrieval of personal financial records.

Another object of the invention is to provide new and improved means especially suitable for keeping checking account and collateral record materials.

A further object of the invention is to provide a new and improved record keeping tray construction which is especially useful as a financial organizer, more particularly as related to checking account record keeping.

A further object of the invention is to provide a new and improved record keeping tray construction particularly suitable for segregating and storing canceled checks and other financial records according to various convenient categories.

Still another object of the invention is to provide new and improved means for conveniently compactly and in an orderly fashion maintaining diverse personal financial records.

A yet further object of the invention is to provide a new and improved record keeping tray construction embodying novel separator insert means.

It is also an object of the invention to provide a new and improved record keeping tray assembly which can be reproduced at low cost from a minumum number of simple and easily constructed and assembled parts.

Other objects, features and advantages of the invention will be readily apparent from the following description of a preferred embodiment thereof, taken in conjunction with the accompanying drawings although variations and modifications may be effected without departing from the spirit and scope of the novel concepts embodied in the disclosure, and in which:

FIG. 4 is a top plan view of the tray shown in FIG. 1;

FIG. 5 is an enlarged fragmentary sectional detail view taken substantially along the line V—V of FIG. 4;

FIG. 6 is an enlarged fragmentary sectional detail view taken substantially along the line VI—VI of FIG. 4;

Figure 1:
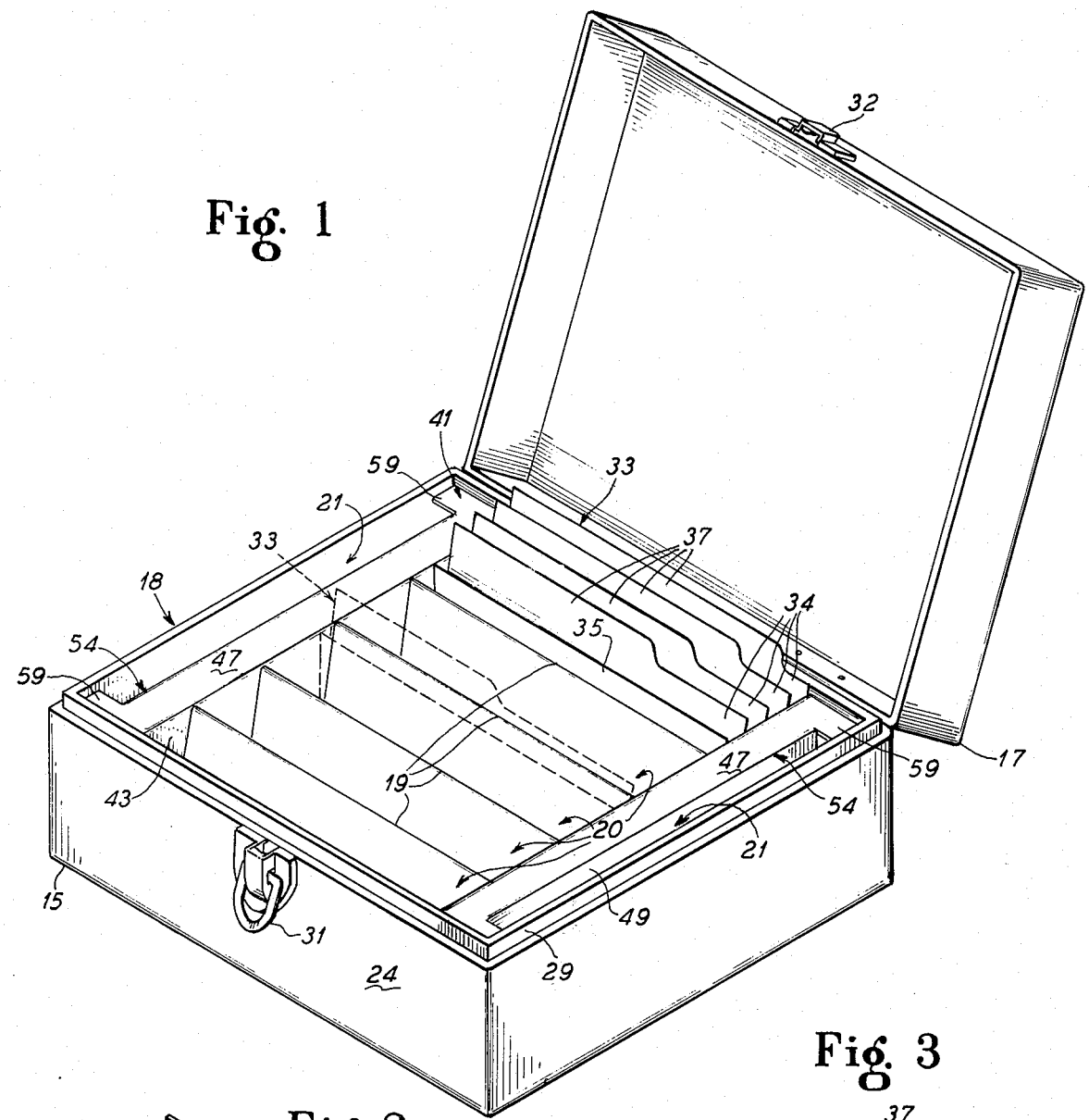
FIG. 1 is an isometric view of a preferred embodiment of the invention.

In a preferred arrangement, a record keeping tray 15 has in assembly therewith a hinged cover 17 providing in closed relation to the tray a neat generally rectangular box 18. In the open position of the cover 17 it exposes the contents of the tray, comprising subdividing means especially equipping the tray to serve as a record storage and retrieval device, and more particularly as a financial records organizer, and especially suited for checking account and collateral records. The subdividing means provide transversely extending spaced generally parallel dividers 19 defining therebetween upwardly opening record-receiving pockets 20, which are desirably especially dimensioned to receive canceled checks and deposit slips disposed therein on one longitudinal edge between the dividers 19. At each side within the tray is provided a respective upwardly opening pocket 21 extending in a front to rear direction to receive such records or record keeping materials as checkbook or check packets, bank statements and the like. At the rear of the tray behind the rearmost of the dividers 19 is provided a further transverse upwardly opening pocket 22 for receiving any other desired collateral records.

In a preferred form, the tray 15 is of rectangular outline in plan, having a bottom wall 23 (FIGS. 5 and 6) and upstanding therefrom connected front wall 24, opposite side walls 25 and 27 and a rear wall 28. In this instance all of the front, side and rear walls are of uniform height, and have secured to their inside a finishing and reinforcing liner 29 which extends a short distance above the upper edges of the tray walls to stabilize seating on the upper edges of the tray walls of the lower edges of corresponding walls of the cover 17. Hinged connection of the cover to the tray is effected as by means of suitable hinge units 30 secured to the tray back wall 28 and the corresponding wall of the cover. To hold the cover closed, a releasable latch 31 is carried by the tray front wall 24 lockingly engageable with a keeper 32 on the corresponding front wall of the cover.

Figure 2:
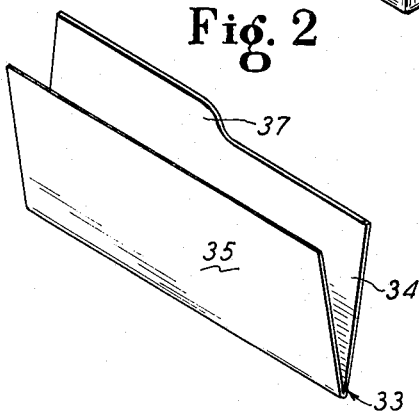
FIG. 2 is an isometric view of a pocket folder to be used in the tray.
Figure 3:
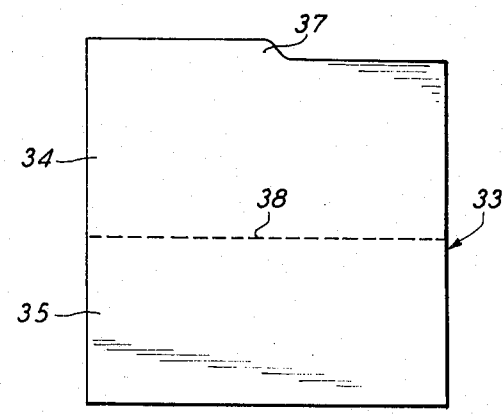
FIG. 3 is a developed or plan view of a blank from which the folder of FIG. 2 is produced.

Each of the records keeping pockets 20 and the pocket 22 is of a front to rear dimension ample to receive a large number of documents such as canceled checks, deposit slips and the like, and since that type of records is on rather thin flexible paper, and generally will relate to numerous types of transactions in several categories, means preferably comprising upstanding, upwardly opening file folders 33 (FIGS. 1 and 2) are desirably supplied in groups of the desired number for each of the pockets. For example, each of the pockets may have on the order of four to six of the folders 33 each of which is provided with a rear panel 34 and a front panel 35, with the rear panel equipped with an upstanding identification tab 37. In each set the tabs 37 are desirably graduated in length for ready identification. Each of the folders 33 is preferably constructed from a single die cut blank as shown in FIG. 3 folded along a score line 38 to provide the pocket panels 34 and 35.

Figure 8:
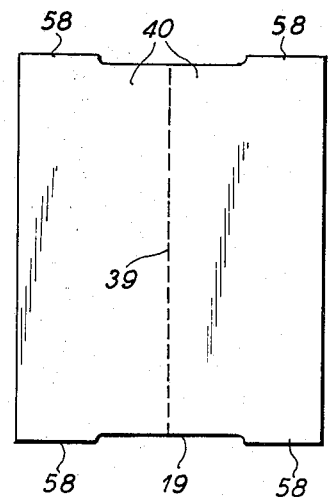
FIG. 8 is a developed plan view of a blank from which one of the dividers of the tray insert assembly is formed.
Figure 9:
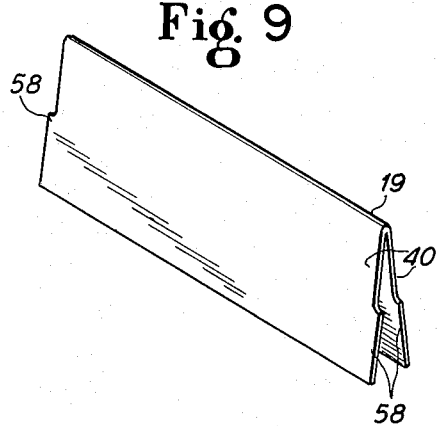
FIG. 9 is an isometric view of one of the dividers formed up from the blank of FIG. 8.

In a simple, efficient and inexpensive construction, the dividers 19 are also constructed of simple folded die cut sheet material, but of heavier gauge than the pocket folder 33. Thus, as best seen in FIGS. 8 and 9, each of the dividers 19 is formed up from a die cut blank intermediately scored along a line 39 to provide equal divider panels 40 meeting at a ridge with the free edges of the panels parallel to the score line 39 supporting the folded divider in upright position.

Figure 7:
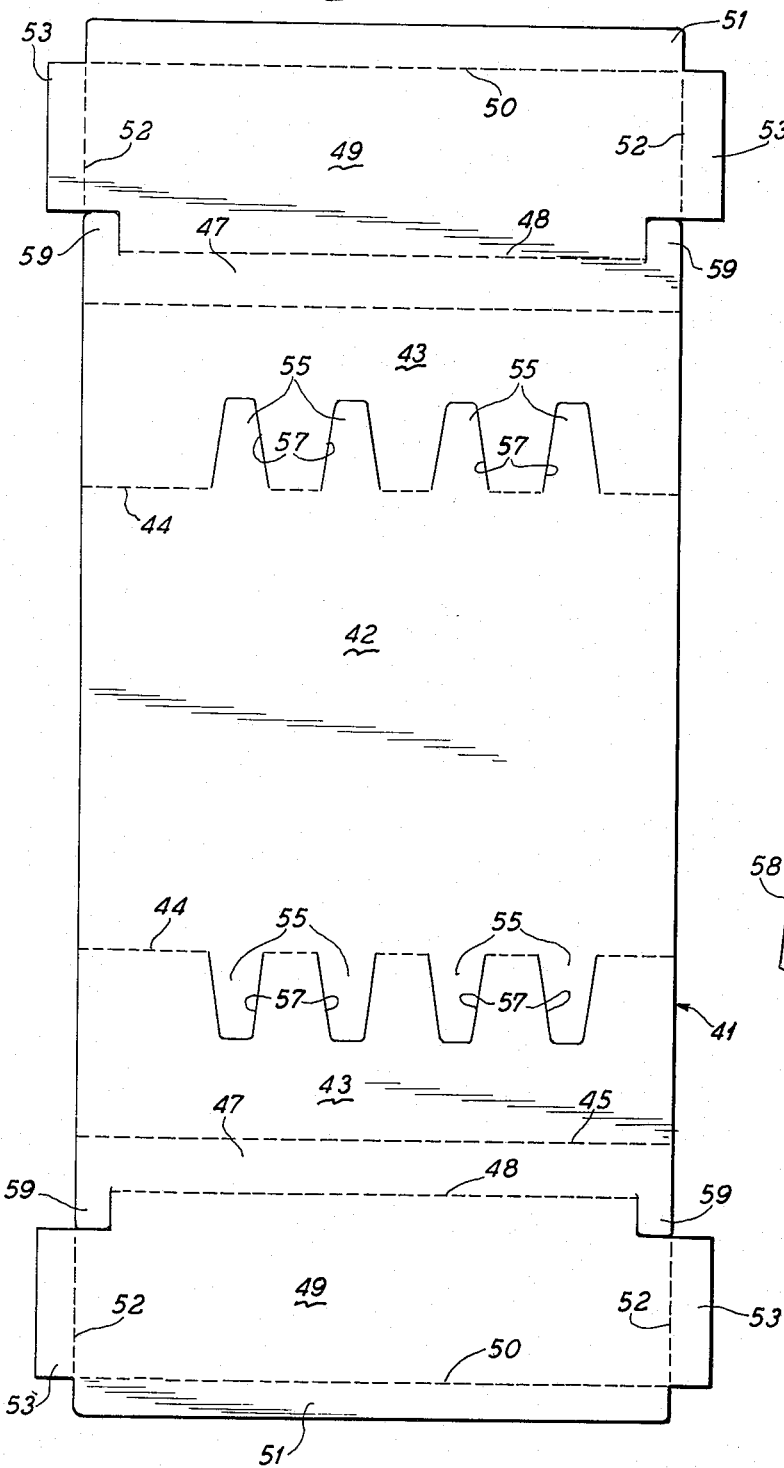
FIG. 7 is a developed or plan view of the blank from which the principal tray insert is formed.

Means for maintaining the dividers 19 in proper orientation within the tray 15 and also defining the pockets 21, comprise an insert 41 which is easily, economically and efficiently constructed as a one piece die cut and scored blank (FIG. 7) arranged to be quickly folded to shape and inserted into the tray 15. For this purpose the insert blank is in the form of an elongated sheet cut from suitable material of proper weight such as cardboard, with the width of the blank substantially equal to the front to rear dimension between the front wall 24 and the rear wall 28 of the tray. Centrally of the insert blank is provided a base panel 42 having at each opposite end, which will be located within the opposite sides of the tray 15 when installed therein, a respective identical pocket end wall closure panel 43 joining the base panel along a score line 44. Joining each of the panels 43 along the score line 45 is a narrow rib crest panel 47 to which is joined along a score line 48 a side pocket defining panel 49 having joined thereto at its long dimension along a score line 50 a narrow spacer panel 51. Along each of its narrow dimensions, the panel 49 has joined thereto along respective score lines 52 narrow spacer panels 53 of the same width as the panel 51. Through this arrangement, by turning the panels 44 along the juncture score lines 44 to stand upwardly, then bending the rib crest panels 47 along the score lines 44 to extend horizontally from the adjacent panel 43, bending the panel 49 along the score line 48 to extend downwardly parallel to the companion panel 43, and bending the panels 51 and 53 along their score line junctures to extend outwardly relative to the panel 49, the insert 41 is ready to be dropped into inserted position within the tray 15. When inserted, there is a slight tendency of the folded panels of the insert to expand toward their original flat condition in the blank, and this thrusts the edges of the spacer flanges 51 and 53 toward frictional engagement with the inner surface of the liner 29 contiguous to the side walls 25 and 27. In the inserted relation of the insert 41 in the tray 15 the panels 43, 47 and 49 cooperate to provide respective reinforcing ribs 54 (FIGS. 1, 4 and 5) along the inner sides of the side pockets 21, as well as closures for the ends of the document receiving pockets 20 and 22.

To enhance stability of the insert 41 in the tray 15 and to attain additional frictional cooperation with the side walls of the tray, a series of spaced spacer and retaining fingers 55 is provided along each opposite side of the base panel 42 so that as the base panel lies on the bottom wall 23 of the tray, distal end tips on the fingers will engage the bottom inner surface of the tray side walls and in this instance the liner 29 (FIGS. 4 and 5). Conveniently, the fingers 55 are struck from the panels 43 at intervals aligned with the dividers 19 and remain integral in one piece, unscored and in relatively rigidly projecting relation in a plane with the base panel 42. Each of the fingers 55 is of a length at least equal to the combined width of the rib crest panels 43 and the spacer panels 51. Thereby, when the insert 41 is folded up, the fingers 55 will underlie the ribs 54 and the spacer panels 51 and engage the liner 29 not only to improve frictional retention of the insert in the tray, but also to maintain the tray firmly against side to side displacement, while the front and rear edges of the base panel 42 as well as the several panels connected thereto along parallel score lines engaging the front and rear wall portions of the liner 29 retain the insert firmly against displacement in a front to rear direction. During insertion of the insert 41 into the tray, upward bending displacement of the fingers 55 is resisted by the overlying lower edge of the panel 49 of the rib 54 at each side, as best visualized in FIG. 4.

In the striking out of the fingers 55, holes 57 are formed in the panels 43. These holes 57 are utilized as means for anchoring the dividers 19. To accomodate the divergent relation of the divider panels 40, the sides defining the holes 57 are similarly divergent whereby to facilitate reception within the holes of complementary anchoring lug flanges 58 on the ends of the divider panels. These anchoring flanges 58 are long enough and wide enough to provide effective anchorage in cooperation with the top and side edges defining the openings 57, but short enough to permit insertion of the flanges 58 into the openings 57 by inserting the anchoring flanges at one end of the divider into the selected opening 57 at one side of the insert and then forcing the flanges 58 at the opposite end of the divider down along the insert panel 43 which will yield resiliently sufficiently for this purpose because of the material from which made, until the lug flanges 58 snap into the opening 57 toward which directed. By virtue of the folded construction of the dividers 19, there is a tendency for the panels 40 to spread apart, and this assures a snug engagement of the anchoring flanges 58 with the side edges defining the openings 57 in the assembled relationship. After all of the dividers 19 have been assembled with the insert 41, the end portions of the dividers above the anchoring flanges 58 thrusting against the ribs 54 provide excellent stability against inward displacement of the ribs; As best seen in FIGS. 1, 5 and 6, in the assembly, the dividers 19 are of a common height with the ribs 54, and such common height is slightly less than the height of the tray wall liner 29.

Improved stability against outward displacement of the ribs 54 is provided by respective spacer tabs 59 providing laterally outward extensions from the rib crest panels 47 at each opposite end of each of the crest panels and struck from the adjacent area of the associated panel 49. Thereby the stabilizing fingers or tab flanges 59 extend in a common plane and rigidly from the crest panels 47 into engagement with the liner 29. In addition, the flanges 59 provide neat opposite end boundaries at the openings from the pockets 21.

From the foregoing it will be apparent that the present invention provides a useful, convenient, efficient, compact, sturdy, attractive, orderly record keeping tray assembly which can be produced and sold at low or at least moderate cost for effective record keeping purposes, especially having regard to financial transactions by way of checking account procedures. Not only do the dividers 19 subdivide the tray into convenient category pocket divisions, but by providing groups of the folders 33 for the pockets numerous category subdivisions can be provided. Not only do the dividers 19 and the folders 33 provide areas for receiving suitable legends indicating category groupings or major subdivisions and minor subdivisions, but the surfaces of the crest panels 47 provide area for suitable legends identifying the pockets 21 for particular uses such as to receive checkbook in one and monthly bank statements in the other, and the like.

It will be understood that variations and modifications may be effected without departing from the spirit and scope of the novel concepts of this invention.

We claim as our invention

1. In an insert assembly for reception within a record keeping tray having a bottom wall and upstanding connected front, rear and opposite side walls:

an insert member formed from a folded blank having a base panel to be received on the bottom wall of the tray;

upstanding side panels folded up from said base panel and defining a storage space therebetween;

outward projections on said side panels for maintaining the side panels in spaced relation to the opposite side walls of the tray;

a plurality of generally upstanding dividers within said storage space and having anchoring lug flanges which are substantially narrower than the width of the dividers and projecting from each opposite end of each divider;

and each of said side panels having anchoring holes complementary to said anchoring lug flanges and into which said anchoring lug flanges extend with the ends of the dividers engaging the upstanding panels.

2. An insert assembly according to claim 1, wherein each of said dividers comprises a pair of folded panels joined at the top and diverging downwardly from the top, said anchoring holes being defined by edges generally conforming to the divergent relation of the divider panels, and each of said divider panels having an anchoring lug flange engaged in a selected anchoring hole.

3. An insert assembly according to claim 1, comprising stabilizing fingers struck from said upstanding panels to provide said anchoring holes, said fingers projecting outwardly integral with and in a plane with said base panel for engagement with the tray side walls.

4. An insert assembly according to claim 3, wherein each of said upstanding panels has an outwardly projecting rib panel along its upper edge, each of said rib panels having along its outer edge a downwardly extending panel provided along its lower edge with an outwardly extending spacer panel overlying the stabilizing fingers.

5. An insert assembly according to claim 4, wherein said rib panels have spacer and stabilizing flanges projecting outwardly therefrom for engagement with the tray side walls.

6. An insert assembly according to claim 1, wherein said side panels include along their upper edges outwardly projecting narrow rib panels, panels projecting downwardly from the outer edges of said rib panels substantially coextensive with said upstanding side panels, and flanges projecting from said downwardly projecting panels providing spacers engageable with the side walls of the tray whereby to define upwardly opening record receiving pockets between the downwardly projecting panels and the tray side walls.

7. An insert assembly according to claim 1, including sets of upwardly opening generally V-shaped folders received between said dividers in said storage space.

8. An insert assembly according to claim 1, wherein said side panels have outwardly projecting flange means for frictional and stabilizing engagement with side walls of the tray.

9. An insert assembly according to claim 8, wherein said frictional and stabilizing flange means comprise narrow generally horizontally extending flanges at the respective opposite ends of the upper portions of said side panels and defining therebetween and with said upstanding panels and the tray side walls upwardly opening record receiving pockets.

10. An insert for reception within a record keeping tray having a bottom wall and upstanding connected front, rear and side walls, and comprising:

an insert member adapted to be inserted in the tray and comprising a one-piece folded blank having a base panel to be placed on the bottom wall of the tray;

upstanding panels foldably connected along opposite sides of said base panel;

narrow rib crest panels foldably connected to the upper edges of said upstanding panels;

downwardly extending panels foldably connected with the outer edges of said rib crest panels and of generally coextensive area with said upstanding panels;

narrow spacer panels along the lower edges of the downwardly extending panels and adapted to maintain a spaced relation between the downwardly extending panels and the side walls of the tray;

and spaced spacer tabs extending from the rib crest panels at opposite ends of the rib crest panels for maintaining the rib crest panels spaced from the tray side wall and defining upwardly opening record keeping pockets between the downwardly extending flanges and the tray side walls.

11. An insert according to claim 10, including spacer fingers struck from said upstanding panels and projecting outwardly in the plane of the base panel and underlying said downwardly extending panels and the spacer panels along the lower edges of the downwardly extending panels.

12. An insert according to claim 11, wherein holes are provided in said upstanding panels by the striking out of said fingers, and upstanding dividers extending between said upstanding panels and having anchoring lug flanges on their ends received in anchoring relation in said holes.

* * * * *

UNITED STATES PATENT AND TRADEMARK OFFICE
CERTIFICATE OF CORRECTION

PATENT NO. : 3,917,105
DATED : November 4, 1975
INVENTOR(S) : Gray Lambert and Paul N. Hanselman It is certified that error appears in the above-identified patent and that said Letters Patent are hereby corrected as shown below:

ASSIGNEE: United Business and Professional Services, Inc.
Oak Park, Illinois

Signed and Sealed this second Day of March 1976

[SEAL]

Attest:

RUTH C. MASON
*Attesting Officer*

C. MARSHALL DANN
*Commissioner of Patents and Trademarks*